Patented Jan. 21, 1941

2,229,599

UNITED STATES PATENT OFFICE 2,229,599

METHOD FOR THE ISOMERIZATION AND DISMUTATION OF HYDROXY - KETONES HAVING A CYCLOPENTANO-POLYHYDROPHENANTHRENE SKELETON

Rupert Oppenauer, Amsterdam, Netherlands, assignor to the firm of Naamlooze Vennootschap Organon, Oss, Netherlands No Drawing. Application June 28, 1937, Serial No. 150,758. In the Netherlands June 27, 1936

19 Claims. (Cl. 260—397)

(Granted under the provisions of sec. 14, act of March 2, 1927; 357 O. G. 5)

In the synthetic preparation of 3-keto-17-hydroxy-compounds, having a cyclopentano-polyhydrophenanthrene skeleton the difficulty is encountered that the starting materials used therefor have the carbonylic group at the carbon atom $C_{17}$ and the hydroxylic group at the carbon atom $C_3$ (for instance dehydroandrosteron) i. e. just contrary as in the 3-keto-17-hydroxy-compounds, having a cyclopentano-polyhydrophenanthrene skeleton (for instance testosteron).

The 3-keto-17-hydroxy-compounds, having a cyclopentano - polyhydrophenanthrene skeleton such as for instance the testosteron and the dihydrotestosteron not only have a greater activity than the isomeric 3-hydroxy-17-keto-compounds such as for instance dehydroandrosteron or isoandrosteron but moreover often show still another physiological action for instance on the seminal vesicle and prostata.

Therefore methods have been searched and found to prepare such substances from isomers thereof or from natural starting materials, but these methods are complicated and the reactions do not go directly to the purpose but via intermediate products for instance hydroxyesters (Ruzicka, Helv. Chim. Acta 18, 1478, 1935).

I have succeeded in effecting this reaction in a very simple and direct way and in this way have converted e. g. the less active 3-hydroxy-17-keto-compounds of the androsteron and dehydroandrosteron type into the more strongly active 3-keto-17-hydroxy-compounds of the dihydrotestosteron and testosteron type.

My process consists herein that hydroxy-ketocompounds (e. g. 3-hydroxy - 17 - keto - compounds) having a cyclopentano-polyhydrophenanthrene skeleton to be isomerized are subjected to the action of metal alcoholates, for instance sodium ethylate, aluminium isopyropylate, chloromagnesium-triphenylcarbinolate, aluminium trimethylcarbinolate-tertiary aluminium-butylate, in a solvent having neither hydroxylic nor keto-groups, such as for instance gasoline, benzene, cyclohexane, etc. In this way besides the lower molecular alcohol resulting from the alcoholate, the alcoholates of e. g. the 3-hydroxy-17-keto-compounds having a cyclopentano - polyhydrophenanthrene skeleton are formed which compounds have the property in the above-mentioned inert solvents to change for a great part into their isomers, which can be recovered in the form of pure crystals. The reaction particularly may be effected with such a small amount of metal alcoholate that when using primary or secondary alcohols the reduction possible thereby can only be of minor importance. In some cases particularly when using primary or secondary alcoholates I prefer to remove the low molecular alcohol by evaporation e. g. in vacuo at the beginning of the reaction. During the reaction a certain quantity of diol and dion derivatives is also formed from which the hydroxy-ketone can be easily separated however. It is also possible to interrupt this reaction at a certain moment and to separate the substances obtained into a hydroxy-ketone fraction and a fraction containing the diols and dions, whereupon the treatment of one of these fractions with metal alcoholates, preferably tertiary metal alcoholates is repeated. Before effecting this repeated treatment I may eliminate the testosteron from the hydroxy-ketonefraction in known way. The repeated treatment of the other fraction containing the diols and dions is preferably so effected that as many hydroxylic as ketone groups are present.

While of the two fractions is subjected to the repeated treatment depends on whether it is desired to obtain mainly either the hydroxy ketone mixture, or a determined isomer, e. g. the testosteron formed by my process from dehydroandrosterone or a mixture containing diols and diones, for example, the mixture containing androstendiol and androstendione prepared by my process from dehydroandrosterone. In the first mentioned case the joint diol and dion fractions are again subjected to the reaction, if desired, together with hydroxy-keto-compounds having a cyclopentano-polyhydrophenanthrene skeleton e. g. the above-mentioned hydroxy-ketone fraction from which the 3-keto-17-hydroxy-compounds have been removed. In the latter case the hydroxy-ketone fraction is again subjected to the reaction. Since no byproducts are formed it is possible in this way to increase the yield of one of the substances desired to approximately the theoretically possible yield. I can also obtain, however, mixtures of substances having a certain physiological action (for instance a greater or smaller action on the growth of the capon's comb with a correspondingly smaller or greater action on the seminal vesicle) by maintaining particular conditions under which the reaction is effected, for instance change of temperature, concentration of the solvent, duration of the reaction, or treating mixtures of hydroxy ketones, diols and dions in different proportions.

The application of my new process is not restricted to the substances mentioned here by way of example, but my process can be generally applied to any hydroxy-keto-compounds having a cyclopentano-polyhydrophenanthrene skeleton in which an isomerization reaction is theoretically possible, that is, in which it is possible for at least one hydroxyl group to be replaced by a keto group. It is obvious, of course, that in the case of compounds wherein the hydroxyl group is connected to a tertiary carbon atom, this group cannot be replaced by a keto group and that therefore the isomerization reaction of this invention is impossible. With this exception all hydroxy-keto-compounds having a cyclopentano-polyhydrophenanthrene skeleton can be converted into their isomeric keto-hydroxy-compounds, or their polyalcoholic or polyketonic derivatives. Moreover it is not necessary to use the hydroxy-keto-compounds in pure state, for instance I may also subject urine extracts, containing such substance to this reaction. The substances obtained by my process may be used in pharmaceutics.

My invention is eulcidated by but however not at all restricted to the following examples:

Example 1

20 g. of dehydroandrosteron are refluxed with 25 g. of tertiary aluminium butylate in 500 cm.$^3$ of anhydrous benzene for 14 hours. The yellowish solution is shaken with diluted sulfuric acid for a short time for the removal of the aluminium. The benzenic solution is washed with water, dried with sodium sulphate and subjected to evaporation. A nearly colourless syrup I remains behind having a two to three times stronger activity in the capon's comb test than the starting material and which syrup is rubbed with 250 cc. of ether. This mixture is allowed to stand for three days, during which crystals II separate, consisting of substantially pure $\Delta^{5,6}$-androstendiol, which crystals are filtered off. After evaporating the etheric solution a syrup III remains behind, which is worked up as follows: By treatment with ketone reagents the diols IV still present are separated from the mixture V consisting of the hydroxy ketones and the androstendion. As ketone reagents I may use semicarbazide, hydroxylamine, betainehydrazine-hydrochloride etc. After the ketone condensation products having been split up a syrup is obtained which is then separated according to methods known per se into a hydroxy ketone fraction VI and into androstendion by treatment with phthalic anhydride or chloro sulphonic acid in pyridine.

Fraction VI gives with a 1 per cent alcoholic digitonine solution a digitonide precipitate which can be split up in known way, for instance by boiling in xylene, and in this way a syrupy fraction VII is obtained, mainly consisting of unchanged dehydroandrosteron. The fraction VIII not precipitated by digitonine and from which crystals separate after some time mainly consists of testosteron which can be obtained in pure crystalline state by recrystallization in a yield of 1.5 to 2.2 grams. If desired the process described may be interrupted at an intermediate stage. For pharmaceutical purposes the fractions I, III, V, VI, VIII may be used. If it is desired to obtain fraction VI in large amount the fractions II and IV and the androstendion from V may be united and again subjected to the reaction or added to a subsequent charge of dehydroandrosteron. If it is desired to obtain crystallized testosteron I may in order to increase the yield, unite all fractions obtained prior to the separation of fraction VIII as well as the mother liquor from VIII and subject the same to a new isomerization treatment. This material may also be used in a subsequent charge.

Example 2

Activation of a concentrate from urine 10 g. of an extract prepared from urine, for instance according to Funk and Harrow (Proc. Amer. Soc. Biol. Chem. 7, LXX, 1931) and Butenandt and Tscherning (Z, Physiol. Chem. 229, 167, 1934) and having an activity of one international capon's comb unit per mg. is refluxed with 250 g. of tertiary aluminium amylate in 1.5 liters of anhydrous toluene. After the reaction is finished the aluminium is removed by shaking with diluted sulphuric acid and the toluene solution is washed with water. The dissolved product may be used for pharmaceutical purposes without additional purification. It shows a 3–5 times stronger activity in the capon's comb test and has, in contrast to the starting material, a strong action on the primary sexual organs. Thus for instance in the seminal vesicle test on rats a unit is found in approximately 0.3 mg. of the material which has not changed in weight during the above-described treatment.

Example 3

24 g. of $\Delta 5$-pregnenol-3-on-20 are refluxed in 600 cc. of toluene with 60 g. of tertiary aluminium butylate for 24 hours. The yellow reaction mixture is thoroughly shaken with diluted sulphuric acid, washed with water whereupon the toluene is removed by evaporation in vacuo. The residue is heated in 180 cc. of pyridine with 50 g. of phthalic anhydride on the steam bath for 3 hours, then poured out into 2 liters of $n/2$-NaOH, whereupon the mixture is extracted by means of ether. The etheric solution is thoroughly washed with water, dried with sodium sulphate and the ether is removed by evaporation. Crude progesteron remains behind, which is recrystallized from methanol. Yield 4.3 g. Melting point 129–130° C.

The aqueous layer is refluxed in the absence of oxygen for 4 hours. After the liquid is cooled down, it is extracted by means of ether. The etheric solution is washed with water and the ether is removed by means of evaporation. Already during the evaporation crystals separate out, consisting of $\Delta 5$-pregnendiol-3,20. The solution containing approximately 150 cc. of ether is allowed to stand for one day. The crystals are sucked off, the mother liquor is concentrated by evaporation and the residue thereof is heated in 150 cc. of glacial acetic acid with 25 g. of Girard-reagent-T on the steam bath for 20 minutes. The solution is then separated in known way by adding ether and aqueous alkaline solution into an etheric ketone-free fraction and an aqueous ketonic fraction (vide Girard, Sandulesco, Helv. Chim. Acta 19, 1095, 1936). The ketone-free fraction consists for the main part of $\Delta 5$-pregnendiol-3,20. The total yield of this substance together with the crystals already sucked off amounts to 4.8 g. The aqueous fraction contains the hydroxyketones in which unchanged $\Delta 5$-pregnenol-3-on-20 is present, which is separated by precipitation with digitonine in 90 per cent alcohol. The clear solution is diluted with water, extracted with ether and the etheric layer is subjected to evaporation. The residue is subjected to sublimation in high vacuo (140° C. at 0.01 mm. Hg). Crystals separate out from the distillate upon the addition of a little diluted acetone after some time, which crystals melt at 161–162° C. and are identical to the Δ4-pregnenol-20-on-3 obtained by Butenandt and Schmidt (Ber. 67, 1901, 1934) in a different way.

If it is desired to prepare progesteron, the whole hydroxyketone fraction is added to the following charge of starting material if desired after previous distillation in high vacuo.

What I claim is:

1. The method for the isomerization and dismutation of hydroxy-keto-compounds having a cyclo-pentano-polyhydrophenanthrene skeleton therein which comprises subjecting urine extracts containing these compounds to the action of metal alcoholates in a solvent containing neither hydroxyl nor keto groups and recovering the resulting conversion products.

2. The method for the isomerization and dismutation of hydroxy-keto-compounds having a cyclo-pentano-polyhydrophenanthrene skeleton therein which comprises subjecting urine extracts containing these compounds to the action of tertiary metal alcoholates in a solvent containing neither hydroxyl nor keto groups and recovering the resulting conversion products.

3. The method for the isomerization and dismutation of hydroxy-keto-compounds having a cyclo-pentano-polyhydrophenanthrene skeleton therein which comprises subjecting urine extracts containing these compounds to the action of metal alcoholates in a solvent containing neither hydroxyl nor keto groups, separating the conversion products obtained into a hydroxyketone fraction on one hand and a fraction containing polyalcoholic and polyketonic compounds on the other hand, subjecting at least one of these separate fractions to a second treatment with metal alcoholates and recovering the conversion product so obtained.

4. The method for the isomerization and dismutation of hydroxy-keto-compounds having a cyclo-pentano-polyhydrophenanthrene skeleton therein which comprises subjecting urine extracts containing these compounds to the action of tertiary metal alcoholates in a solvent containing neither hydroxyl nor keto groups, separating the conversion products obtained into a hydroxyketone fraction on one hand and a fraction containing polyalcoholic and polyketonic compounds on the other hand, subjecting at least one of these separate fractions to a second treatment with tertiary metal alcoholates and recovering the resulting conversion products.

5. As a new composition of matter the isomerization product obtained by subjecting urine extracts containing hydroxy-keto-compounds having a cyclopentano-polyhydrophenanthrene skeleton to the action of metal alcoholates in a solvent containing neither hydroxyl nor keto groups and recovering the converted product.

6. In the isomerization and dismutation of hydroxy-keto compounds having hydroxy and keto groups attached to a cyclopentano-polyhydrophenanthrene nucleus and in which it is theoretically possible for at least one hydroxyl group to be replaced by a keto group, the process which comprises subjecting such a compound to the action of a metal alcoholate in the presence of a solvent free from hydroxyl and keto groups and recovering the resulting conversion products.

7. The process of claim 6 wherein said hydroxy and said keto groups are attached to said nucleus in the 3 and 17 positions, respectively.

8. The process of claim 6 wherein said hydroxy and said keto groups are attached to said nucleus in the 3 and 20 positions, respectively.

9. The process of claim 6 wherein said metal alcoholate is a tertiary alcoholate.

10. In the isomerization and dismutation of hydroxy-keto compounds having hydroxy and keto groups attached to a cyclo-pentano-polyhydrophenanthrene nucleus and in which it is theoretically possible for at least one hydroxyl group to be replaced by a keto group, the process which comprises subjecting such a compound to the action of a metal alcoholate in the presence of a solvent free from hydroxyl and keto groups, separating the reaction products into a hydroxy-ketone fraction and a fraction containing polyalcoholic and polyketonic compounds and subjecting at least one of said fractions to a second treatment with a metal alcoholate.

11. The process of claim 10 wherein said hydroxy and said keto groups are attached to the cyclo-pentano-polyhydrophenanthrene nucleus in the 3 and the 17 positions, respectively.

12. The process of claim 10 wherein said hydroxy and said keto groups are attached to the cyclo-pentano-polyhydrophenanthrene nucleus in the 3 and 20 positions, respectively.

13. The process of claim 10 wherein said metal alcoholate is a tertiary alcoholate.

14. As a new composition of matter, the reaction products obtained by subjecting a compound, containing a cyclo-pentano-polyhydrophenanthrene nucleus with a hydroxy and a keto group attached in the positions 3 and 17 of said nucleus, to the action of metal alcoholates in a solvent free from hydroxyl and keto groups; said reaction products containing diol and dione compounds of said cyclo-pentano-polyhydrophenanthrene, the 3-keto-17-hydroxy isomerization product and the residual unconverted 3-hydroxy-17-keto compound.

15. As a new composition of matter, the reaction products obtained by subjecting a compound, containing a cyclo-pentanopolyhydrophenanthrene nucleus with a hydroxy and a keto group attached to said nucleus in the positions 3 and 20, to the action of metal alcoholates in a solvent free from hydroxyl and keto groups; said reaction products containing diol and dione compounds of said cyclo-pentano-polyhydrophenanthrene, the 3-keto-20-hydroxy isomerization product and the residual unconverted 3-hydroxy-20-keto compound.

16. In the isomerization and dismutation of hydroxy-keto compounds, the process which comprises subjecting an organic compound, containing a cyclo-pentano-polyhydrophenanthrene nucleus having at least one keto and at least one hydroxy group attached thereto and in which it is theoretically possible for at least one hydroxyl group to be replaced by a keto group, to the action of a metal alcoholate in the presence of an inert solvent and recovering the resulting conversion products.

17. The process which comprises subjecting cyclo-pentano-polyhydrophenanthrene compounds, having hydroxy and keto groups attached to the cyclo-pentano-polyhydrophenanthrene nucleus in which the keto and hydroxy groups occur in substantially equal numbers and in which it is theoretically possible for at least one hydroxyl group to be replaced by a keto group, to the action of a metal alcoholate in the presence of an inert solvent and recovering the resulting conversion products.

18. The process which comprises subjecting a mixture of diol and dione compounds of cyclopentano-polyhydrophenanthrene, in which it is theoretically possible for at least one hydroxyl group to be replaced by a keto group, to the action of a metal alcoholate in the presence of an inert solvent and recovering the resulting conversion products.

19. The process which comprises subjecting an organic compound, containing a cyclo-pentano-polyhydrophenanthrene nucleus having one reactive hydroxyl group and one reactive keto group attached to said nucleus and in which it is theoretically possible for the hydroxyl group to be replaced by the keto group, to the action of a metal alcoholate in the presence of an inert solvent and recovering the resulting conversion products.

RUPERT OPPENAUER.